J. Toll,
Sawing Stone.
No. 413. Reissued Dec. 9, 1856.
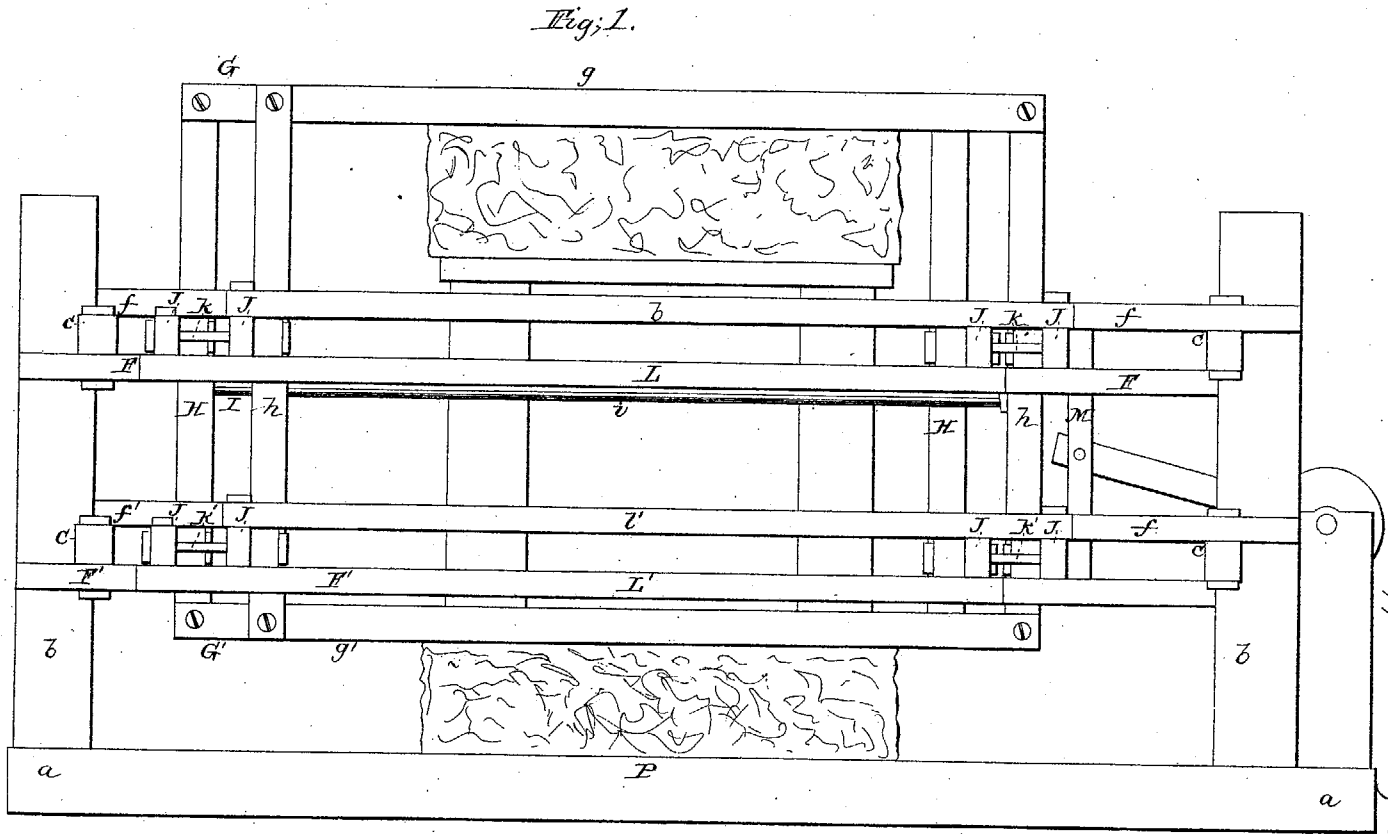
AM. PHOTO-LITHO. CO. N.Y. (OSBORNE'S PROCESS)

2 sheets-sheet 2.
J. Toll,
Sawing Stone.
No. 413. Reissued Dec. 9, 1856.
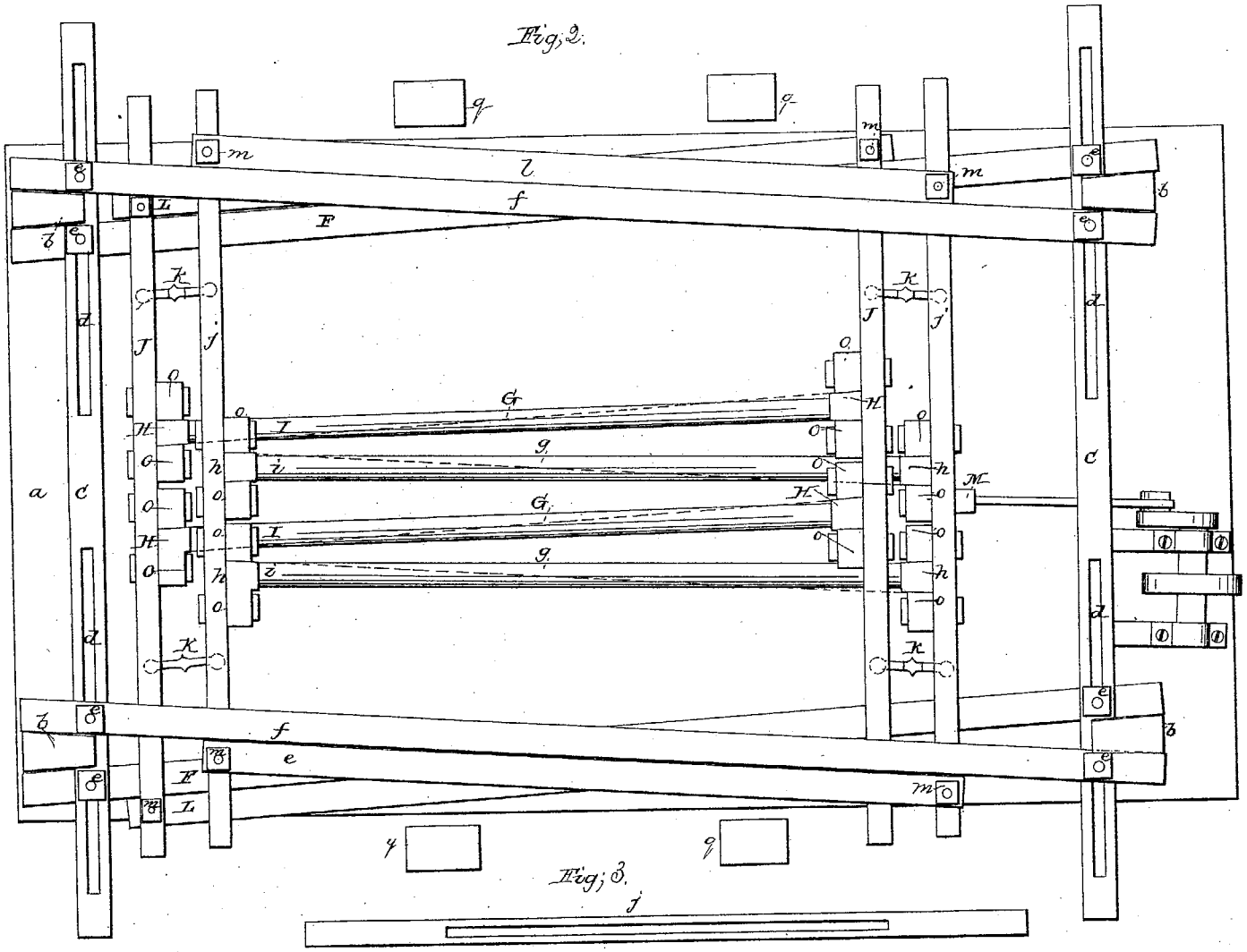
AM. PHOTO-LITHO. CO. N.Y. (OSBORNE'S PROCESS)

UNITED STATES PATENT OFFICE.

JOSE TOLL, OF LOCUST GROVE, OHIO.

IMPROVEMENT IN MARBLE-SAWING MACHINES.

Specification forming part of Letters Patent No. 15,713, dated September 9, 1856; Reissue No. 413, dated December 9, 1856.

*To all whom it may concern:*

Be it known that I, JOSE TOLL, of Locust Grove, Adams county, Ohio, have invented a a new and useful Improvement in Marble-Sawing Machinery; and I do hereby declare the following to be a full, clear and exact description thereof, reference being had to the annexed drawings, making part of this specification.

My improvements have relation to an arrangement of duplicated and connected fender-bars and guiding-pieces by which the bar of one set of saws at either end of the set serves as the point or fulcrum for the adjustment of the corresponding pieces of the other set at that end, a single movement resulting in a uniform adjustment of the guide-pieces of an entire set, and enabling two interposed sets of diverging saws to be driven from a single crank or its equivalent.

In the annexed drawings, Figure 1 is a side view of a machine embodying my improvements. Fig. 2 is a top view thereof. Fig. 3 is a side view of a fender-bar.

*a* is a heavy framing of sill-pieces supporting four stanchions, *b*. To the inner sides of the stanchions there are affixed cross-rails *c*, which, in the present illustration, are four in number, two above and two below. These rails *c* have vertical slots *d*, holding or containing bolts *e*, for the attachment of guide-strips *f* F *f′* F′, eight in number. A pair of these strips is attached, as represented, at the desired angles at or near each end of each cross-rail *c*, one of each pair of strips being fastened above the rail and the other below it.

Saw-blades *g g′* G G′ are attached to posts *h* H′ in the manner represented, namely, with a blade, *g*, fixed at the right-hand side of one post and at the left-hand side of the opposite post of the gate above, another blade, *g′*, being similarly fastened to the same posts below. A stretcher, *i* I, is then keyed fast between the posts of each pair midway between the upper and lower blades. Several saw-gates *g g′ h i g g′ h i* being thus constructed, others, G G′ H I G G′ H I, are similarly formed, with the difference that the blades G G′ of the second set are in each instance fastened on their posts reversely to those before described, so as to bring blade opposite to blade and post to post alternately. Then the two several kinds of gates, being placed alternatingly side by side, are secured to their respective sets of fender-bars *j j′* J J′ by means of cleats *o o*, which, having been carefully adjusted, are bolted to the slotted bars *j j′* J J′. This mode of attachment, while it compels the gates to travel to and fro with the bars, permits them to sink their way through the stone. The upper and lower bars, *j j′*, to which the first set are secured being placed a little in advance of and on a level with the corresponding bars, J J′, of the second set, respectively, each pair of adjacent bars of the respective sets are then connected by a pair of links, *k k′*, holding them constantly parallel with varying longitudinal adjustments of the bars, as heretofore explained.

Each respective upper and lower pair of bars of each set of saws have their corresponding ends connected by rails *l l′* L L′, the connection of the rails and bars being in each case made by means of a single round bolt, *m*, forming a hinge-joint, so that the two bars and the connecting-rails of each set constitute a quadrilateral frame-work capable of assuming any angularity that may be desired. These sliding rails bear against the guiding-strips *f f′* F F′, which, being bolted at any desired corresponding parts of the rails *c*, determine and govern the direction of motion of the gates, the sliding rails *l l′* L L′, by their hinged connection to the bars *j j′* J J′, assuming the corresponding angularity to the strips, and the saws also having been previously carefully adjusted to parallelism with their sliding rails and secured thereto by the bolts and cleats upon the slotted fender-bars conform simultaneously and automatically to any adjustment of the guide-strips, so that one guide-strip of each set being fixed as desired the sliding rails belonging to the other strips afford an accurate gage for the adjustment of their respective strips. The guide-strips of one set being fixed, the corresponding fender-bars afford, by the linked connection *k k′*, a convenient and fixed fulcrum or bearing for the relative adjustment of the other set. This linked arrangement also enables a single crank to work all the saws of both sets, the crank being connected to a post, M, attached to the two forward fender-bars of the first set.

In operation, both sets of gates being simultaneously drawn forward by the crank, each set is compelled by its respective guide-strips to move in a path parallel with its saw-blades, the links permitting lateral divergence while causing both sets to advance and recede together.

By reference to the drawings it will be seen that my mode of attaching the ends of the consecutive saws alternately on the right and left sides of their respective posts enables them to work so closely where they converge as to cut a taper slab of any thinness. *p* P are the upper and lower platforms, upon which the blocks are laid. *q* are posts supporting the upper platform.

I am aware that there have been heretofore machines for sawing marble in taper form, and therefore make no claim to such; but

What I claim as new and of my invention is—

The particular combination and arrangement of the fender-bars J J′ *j j′* with the adjustable guide-pieces, when the same are constructed and arranged to operate in relation to each other in the manner and for the purpose set forth.

In testimony of which invention I hereunto set my hand before two subscribing witnesses.

JOSE TOLL.

Witnesses:

GEO. H. KNIGHT,
JAMES H. GRIDLEY.